United States Patent [19]

Tonomura et al.

[11] 4,413,616
[45] Nov. 8, 1983

[54] SOLAR HEAT COLLECTOR ASSEMBLY

[75] Inventors: Toshiya Tonomura, Nara; Koichi Takeishi, Sakai; Mitsuhiro Shimada; Atsuyuki Katto, both of Nara, all of Japan

[73] Assignee: Sharp Kabushiki Kaisha, Osaka, Japan

[21] Appl. No.: 212,443

[22] Filed: Dec. 3, 1980

[30] Foreign Application Priority Data

Dec. 3, 1979 [JP]  Japan ............................ 54-167869[U]

[51] Int. Cl.³ ................................................ F23J 3/02
[52] U.S. Cl. .................................... 126/443; 126/417; 126/446; 126/450
[58] Field of Search .............. 126/417, 443, 446, 442, 126/450; 428/432, 636; 65/59

[56] References Cited

U.S. PATENT DOCUMENTS 4,053,866 10/1977 Merz et al. ..................... 428/433 A
4,080,954 3/1978 de Wilde et al. ................... 126/443
4,119,085 10/1978 Knowles et al. ..................... 126/443
4,159,706 7/1979 Mahdjuri ........................ 126/443 X
4,183,351 1/1980 Hinotani et al. ..................... 126/443

Primary Examiner—Larry Jones
Attorney, Agent, or Firm—Birch, Stewart, Kolasch & Birch

[57] ABSTRACT

A solar heat collector assembly includes a cylindrical transparent tube having an open end portion hermetically sealed by the use of a sealant and being held in vacuum state and a heat-collecting pipe secured in the transparent tube with its end portion extending outside the transparent tube through the sealant. The sealant of a transparent material, for example, is bowl-shaped and the heat-collecting pipe is secured to pass through the center of the bowl-shaped sealant. The pipe and the sealant are bonded together through the use of a proper adhesive metal material. The outer periphery of the sealant is further bonded to the open end portion of the transparent tube. The adhesive metal material is typically 426 alloy.

3 Claims, 5 Drawing Figures

PRIOR ART

SOLAR HEAT COLLECTOR ASSEMBLY

BACKGROUND OF THE INVENTION

This invention relates to a solar heat collector.

There are generally two kinds of solar heat collectors in the art: one wherein a proper vehicle (for example, water) is supplied and circulated within a rectangular box and the other wherein a narrow copper tube is inserted into a cylindrical vacuum glass tube for passage of a proper vehicle. When it is desired to achieve air-conditioning through the utilization of solar heat energy, the latter vacuum tube type is the only effective way in elevating the temperature of the vehicle to a desired value. Accordingly, the vacuum tube type of solar heat collectors seems to be more promising but has still a variety of problems especially in conjunction with manufacturing techniques and operating life.

More particularly, reference is now made to FIGS. 1 and 2 to give a better understanding of these aspects. In FIGS. 1 and 2, there are illustrated an outer glass tube 1 which serves as a transparent cover and a casing and a cylindrical fin structure 2 which comprises a selective absorbent overlaying at least on its outer surface and is made of typically aluminum by well-known extrusion molding. A heat-collecting pipe 3 of typically copper in heat conducting contact with the cylindrical fin structure 2 provides a passage for the vehicle which is to be heated by depriving the cylindrical fin structure 2 of heat absorbed therein. A sealant 4 is provided at one end of the outer glass tube 1. In order to secure tightly the sealant 4 to the outer glass tube 1, it is desirable that the sealant 4 be made of a material which has substantially the same coefficient of thermal expansion as that of the glass tube 1, for example, an iron-nickel-chromium alloy and be bonded to the outer glass tube 1 by the use of a proper adhesive such as low melting point glass frit. Furthermore, the sealant 4 is attached to the collecting pipe 3 through wax. The outer glass tube 1, combined with the sealant 4, forms a vacuum chamber. A vacuum cavity 5 is defined by the outer glass tube 1 and the sealant 4 and brought into vacuum state with the aid of a vacuum pump connected to a chip tube (not shown). A spacer 6 of ceramic material, for example, is provided to secure the cylindrical fin structure 2 in place in the interior of the outer glass tube 1. Since the heat collecting pipe 3 is off the center of the outer glass tube 1, force resulting from thermal expansion does not act evenly on the sealant 4 and eventually destructs part of the bonding section even though any measure is taken to absorb such uneven force. It is therefore necessary that the glass 1, the sealant 4 and the adhesive 7 have substantially the same coefficient of thermal expansion to keep tight and ever-lasting adhesion. A proper sealant material may be Fe-Ni alloy and 426 alloy in conjuction with soda glass and Kover in conjuction with class II hard glass. A proper adhesive may be low melting point glass having a coefficient of thermal expansion equal to that of the glass tube and the sealant. Howver, in the event that a metallic material such as 426 alloy and Kover is exposed to the atmosphere, it will become rusted and corroded. For these reasons such material is improper for use in solar heat collector assemblies. Anti-rust treatment seems necessary for surfaces of these metallic materials and is actually achieved by plating or deposition of a rust proofing coating. Such treatment is however less reliable for a prolonged period of time.

While the outer glass tube 1 is sealed with the metallic sealant 4, a considerable amount of heat is liberated from the sealant 4 and the heat-collecting pipe 3 and the sealant 4 of a platelike configuration is easily deformable under the influence of the atmospheric pressure.

OBJECTS AND SUMMARY OF THE INVENTION

Accordingly, it is an object of the present invention to provide an improved solar heat collector assembly wherein little or no metallic material is used for a bonding section with a minimum of heat loss and a maximum of corrosion resistance.

According to one preferred embodiment of the present invention, there is provided a solar heat collector assembly including a clindrical transparent tube having an open end position hermetically sealed by the use of a sealant and being held in vacuum state and a heat-collecting pipe secured in the transparent tube with its end portion extending outside the transparent tube through the sealant. The sealant of transparent material, for example, is bowl-shaped and the heat-collecting pipe is secured to pass through the center of the bowl-shaped sealant. The pipe and the sealant are bonded together through the use of a proper sealing metal material. The outer periphery of the sealant is further bonded to the open end portion of the transparent tube.

BRIEF DESCRIPTION OF THE DRAWINGS

For a more complete understanding of the present invention and for further objects and advantages therof, reference is now made to the following description taken in conjunction with the accompanying drawings, in which.

DETAILED DESCRIPTION OF THE INVENTION

Figure 1:
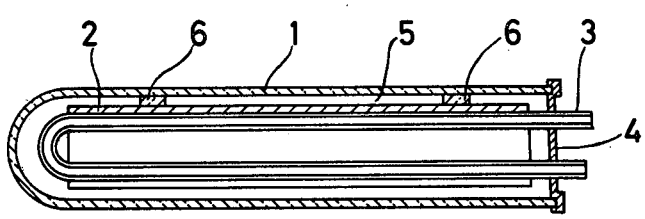
FIG. 1 is a cross-sectional view of a prior art solar heat collector assembly.
Figure 2:
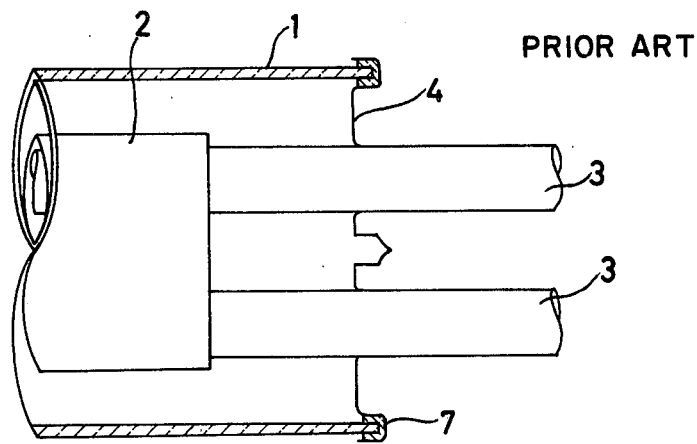
FIG. 2 is an enlarged cross-sectional view of an essential part of the prior art assembly.
Figure 3:
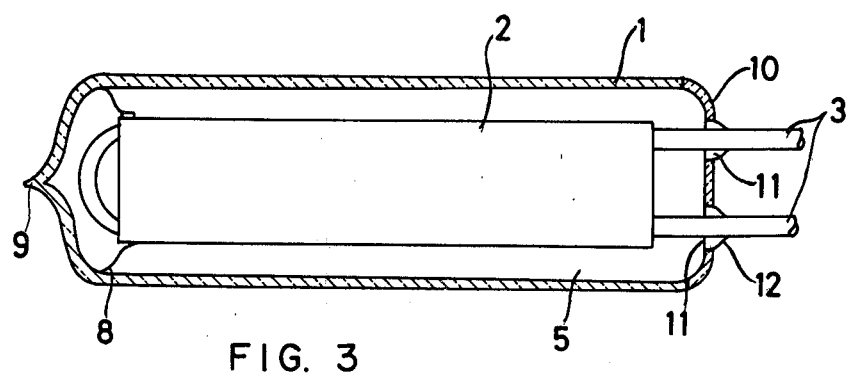
FIG. 3 is a cross-sectional view of a solar heat collector assembly constructed according to the present invention.
Figure 4:
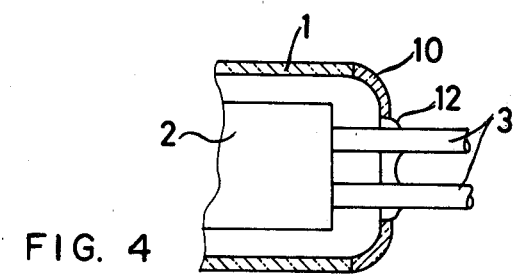
FIGS. 4 and 5 are cross-sectional views of other embodiments of the present invention.
Figure 5:
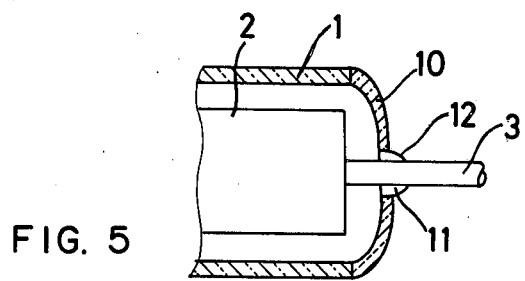

Reference is now made to FIGS. 3 through 5 which illustrate a solar heat collector assembly according to preferred embodiments of the present invention. Similar reference designations as used in FIGS. 1 and 2 are provided in FIGS. 3 through 5 wherever possible to designate similar elements. In FIG. 3, a spacer 8 has one end connected to the cylindrical fin structure 2 which is secured at the center of the glass tube 1. A discharging chip tube 9 is provided to place the glass tube 1 into vacuum state. A transparent sealant 10 is bowl-shaped with the same shape and dimension as the open end portion of the glass tube. It is preferable that the sealant be made of the same glass material as the glass tube. The outer periphery of the bowl-shaped sealant 10 is molten and bonded to the open end portion of the outer glass tube 1 as seen from FIG. 3. Apertures 11 are formed at the center of the glass sealant 10 to lead the heat-collecting pipe 3 outside the glass tube 1. A hermetic seal is built between the apertures 11 and the heat-collecting tube 3 through the use of a proper sealing metal material having substantially the same coefficient of thermal expansion as that of the sealant 10 (for example, 426 alloy when soda glass is used). Since the heat-collecting pipe 3 of typically copper and the sealing metal material permit metal-to-metal bonding, both can be bonded together by a well-known technique such as silver-waxing or welding. It is also possible and easy to heat and bond the sealing metal material 12 and the sealant 10 because of similarity of the coefficient of thermal expansion of the two. In addition, the processing and bonding of the sealant 10 and the glass tube 1 is very easy to achieve as long as the tube 1 and the sealant 10 are both glass and similar in coefficient of thermal expansion. It is believed that the sealing metal material 12 demonstrates good adhesion to the sealant 10 via an oxide which is deposited on a surface of the metal material 12 and diffused into the interior of the sealant. It is clear from the foregoing the thickness of the sealing metal material 12 should be as small as possible, typically 6 to 10 mm.

It is obvious that the bowl-shaped sealant 10 may be completed by the pressing of molten glass, secondary molding of a glass plate or a glass tube or pressing and sintering of glass powders. The last method has the advantage that adhesion is possible concurrently with sintering of the sealing metal material 12.

In order to manufacture the solar collector assembly of FIG. 3, the sealant 10 and the heat-collecting pipe 3 to which the fin structure is previously attached are tightly bonded through the use of the adhesive metal material 12. The resulting assembly is inserted into the glass tube 1 from the heat-collecting fin side 2. After being placed in register with each other, the open end portion of the glass tube 1 and the outer periphery of the sealant 10 are heated and bonded. If the glass tube 1 and the sealant are made of exactly the same material in this instance, then there is the likelihood that the sealant 10 would deform due to the high temperatures during the bonding procedure. One solution to this problem is the use of a material having a higher softening point than the glass tube 1 and a coefficient of thermal expansion similar to that of the glass tube 1, as a proper material of the sealant. A representative material which satisfies the above criteria is a glass material which is similar in composition to the material of the glass but further contains heavy metal such as tungsten.

It is clear that in the above embodiment the sealant 10 is bent and expanded outwardly so that it is hardly deformable under the influence of the atmospheric pressure and the collector assembly is rigid and tough per se.

FIG. 4 shows another preferred embodiment of the present invention wherein two separate heat-collecting pipes 2 are sealed by the same sealing metal material 12 in the case where the distance between two opposite ends of the pipe 2 is small. FIG. 5 shows yet another embodiment wherein the single heat-collecting pipe 3 is led from one end of the glass tube 1. It is appreciated that the transparent tube may be made of plastic material instead of glass.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A solar heat collector assembly comprising:
   a cylindrical transparent glass tube having an open end portion;
   a bowl-shaped sealant material bonded to said open end portion of said tube which hermetically seals said open end of said cylindrical transparent tube in a vacuum state, said sealant comprising a material which is the same as said transparent tube material including a heavy metal which raises the softening temperature of said sealant higher than the softening temperature of said tube, said sealant having a coefficient of thermal expansion similar to that of said tube material;
   a heat-collecting metallic pipe for transporting a heat-collecting vehicle secured in said transparent tube, said pipe having an end portion which projects outside said open end portion of said transparent tube through said sealant; and
   a metallic adhesive material having a coefficient of thermal expansion similar to that of said sealant which bonds said heat-collecting metallic pipe to said sealant.

2. A solar heat collector assembly as defined in claim 1 wherein said sealant and said transparent tube are made of substantially the same glass material.

3. A solar heat collector assembly as recited in claim 1 wherein said heavy metal comprises tungsten.

* * * * *